United States Patent
Kuroyanagi

(10) Patent No.: US 6,703,749 B2
(45) Date of Patent: Mar. 9, 2004

(54) THREE PHASE MOTOR

(75) Inventor: Toru Kuroyanagi, Anjo (JP)

(73) Assignee: Aisin AW Co., Ltd. (JP)

(*) Notice: Subject to any disclaimer, the term of this patent is extended or adjusted under 35 U.S.C. 154(b) by 79 days.

(21) Appl. No.: 09/953,232

(22) Filed: Sep. 17, 2001

(65) Prior Publication Data

US 2002/0084713 A1 Jul. 4, 2002

(30) Foreign Application Priority Data

Dec. 28, 2000 (JP) .......................................... 2000-399666

(51) Int. Cl.⁷ .............................................. H02K 3/00
(52) U.S. Cl. ......................................... 310/180; 310/184
(58) Field of Search ................................ 310/180, 198, 310/184

(56) References Cited

U.S. PATENT DOCUMENTS

| | | | | |
|---|---|---|---|---|
| 3,739,213 A | * | 6/1973 | Willyoung | 310/198 |
| 4,172,984 A | * | 10/1979 | Daugherty et al. | 310/71 |
| 4,488,072 A | * | 12/1984 | Archibald et al. | 310/71 |
| 4,866,316 A | * | 9/1989 | Humphries et al. | 310/71 |
| 5,442,250 A | * | 8/1995 | Stridsberg | 310/186 |
| 5,828,147 A | * | 10/1998 | Best et al. | 310/71 |
| 5,915,643 A | * | 6/1999 | Dolgas | 242/433 |
| 6,208,056 B1 | * | 3/2001 | Perkins | 310/179 |
| 6,271,608 B1 | * | 8/2001 | Haydock et al. | 310/71 |
| 6,469,413 B1 | * | 10/2002 | Oohashi et al. | 310/184 |
| 6,470,984 B1 | * | 10/2002 | Nakajima et al. | 180/65.2 |

* cited by examiner

Primary Examiner—Joseph Waks
(74) Attorney, Agent, or Firm—Lorusso, Loud & Kelly

(57) ABSTRACT

A three-phase motor allows connection of neutral end portions of the coil conductors without substantially increasing the axial length of the motor. The neutral end portions of the coil conductors extend in parallel arrangement over end portions of the coil assemblies to the peripheral outer side of the coil assemblies where neutral end portions of the coil conductors are connected to spaced points on a bus bar to form a neutral for the three phases of the coils.

29 Claims, 16 Drawing Sheets

FIG. 7(a)
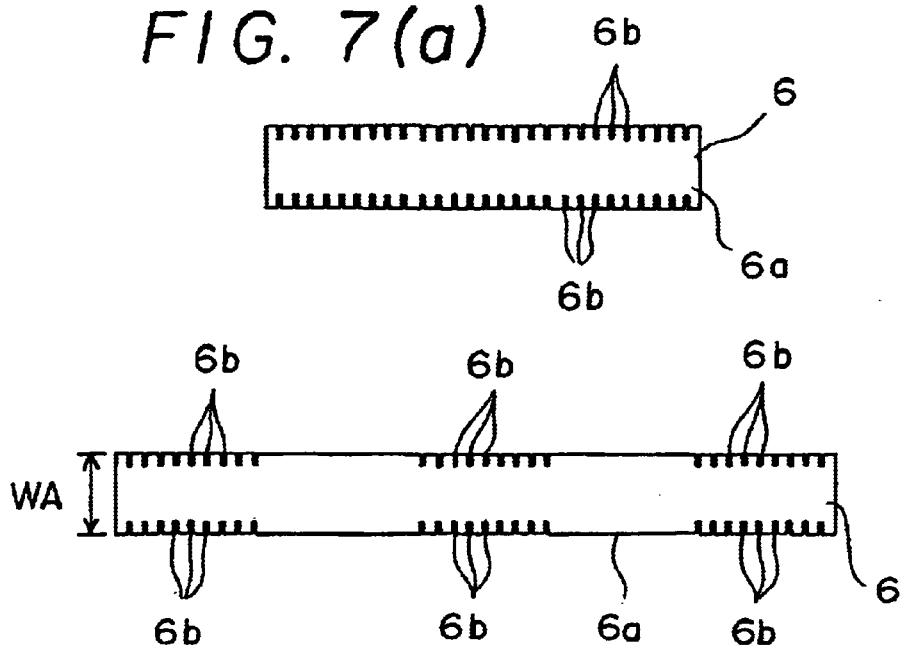
FIG. 7(b)
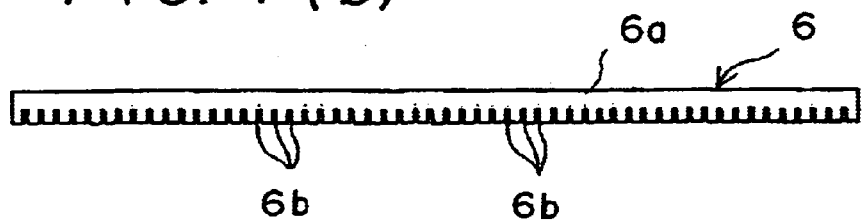
FIG. 7(c)
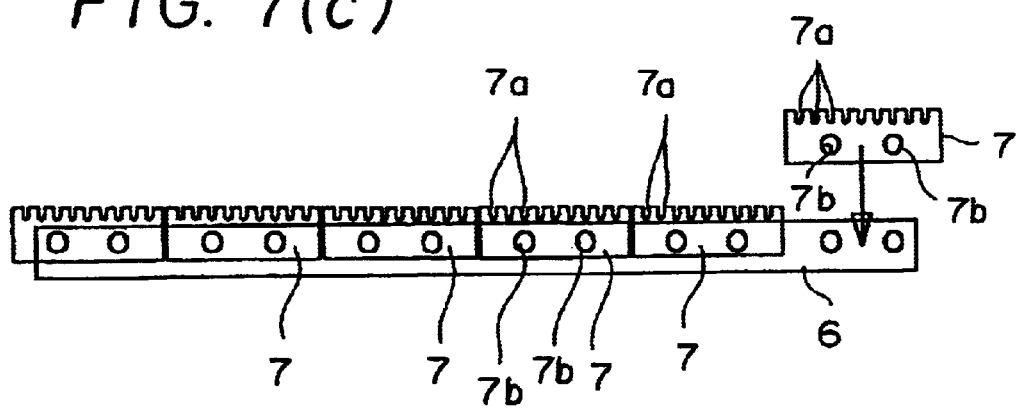
FIG. 7(d)

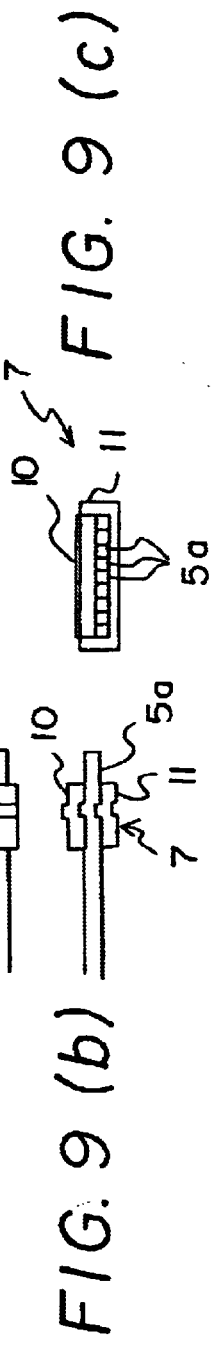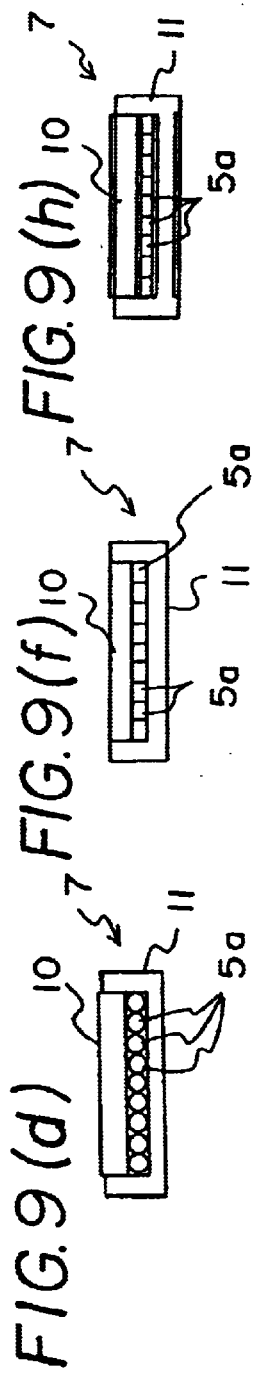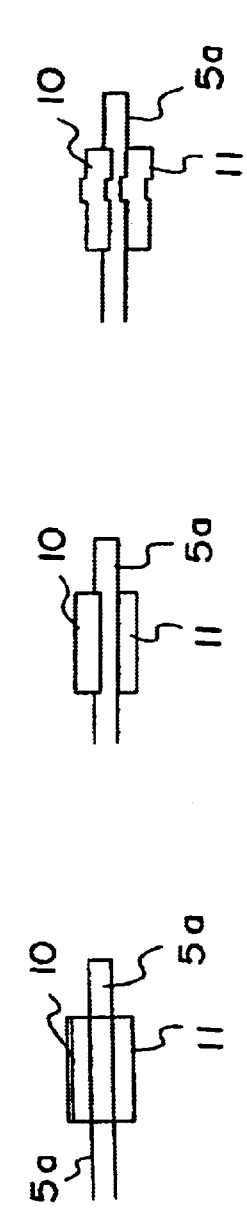

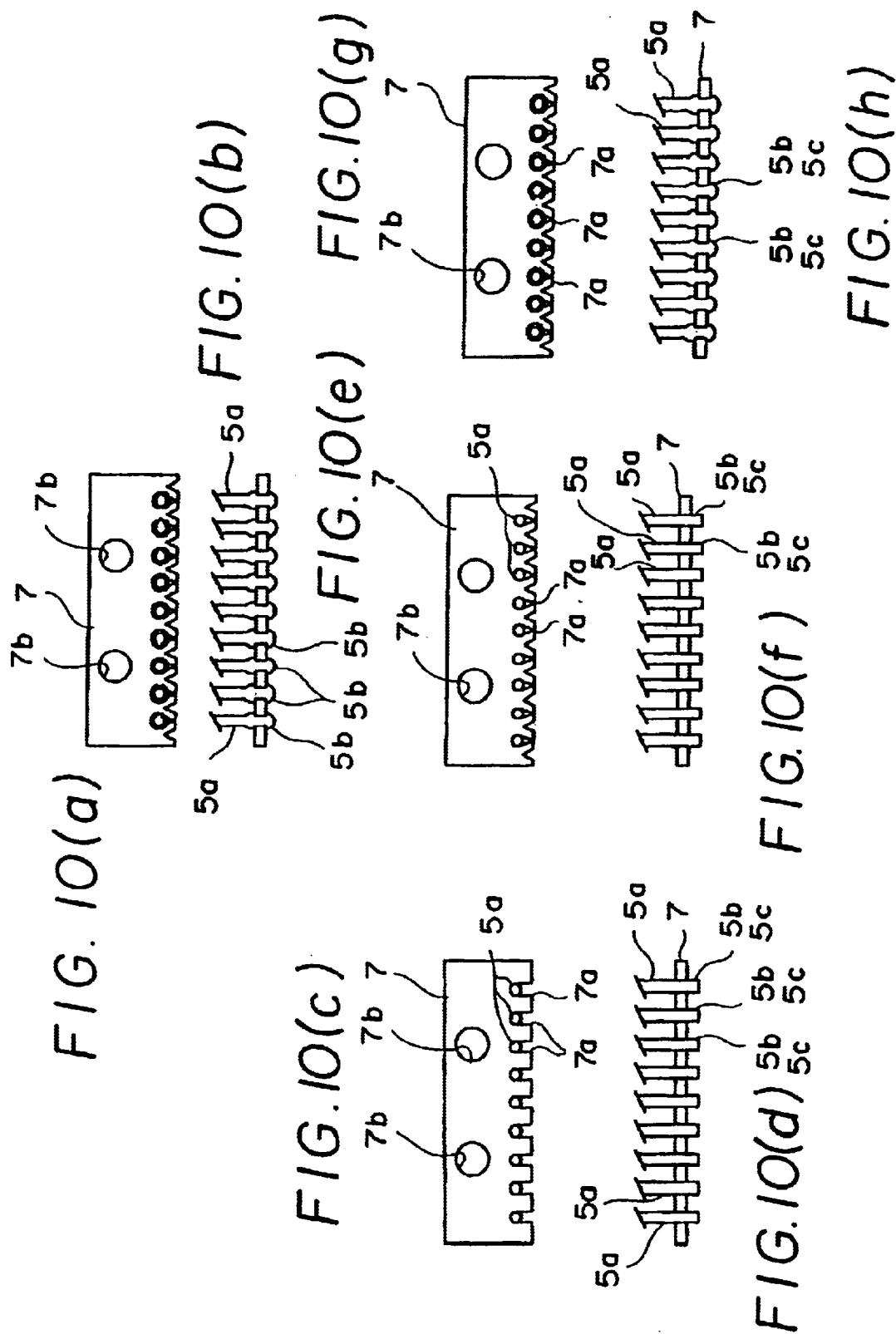

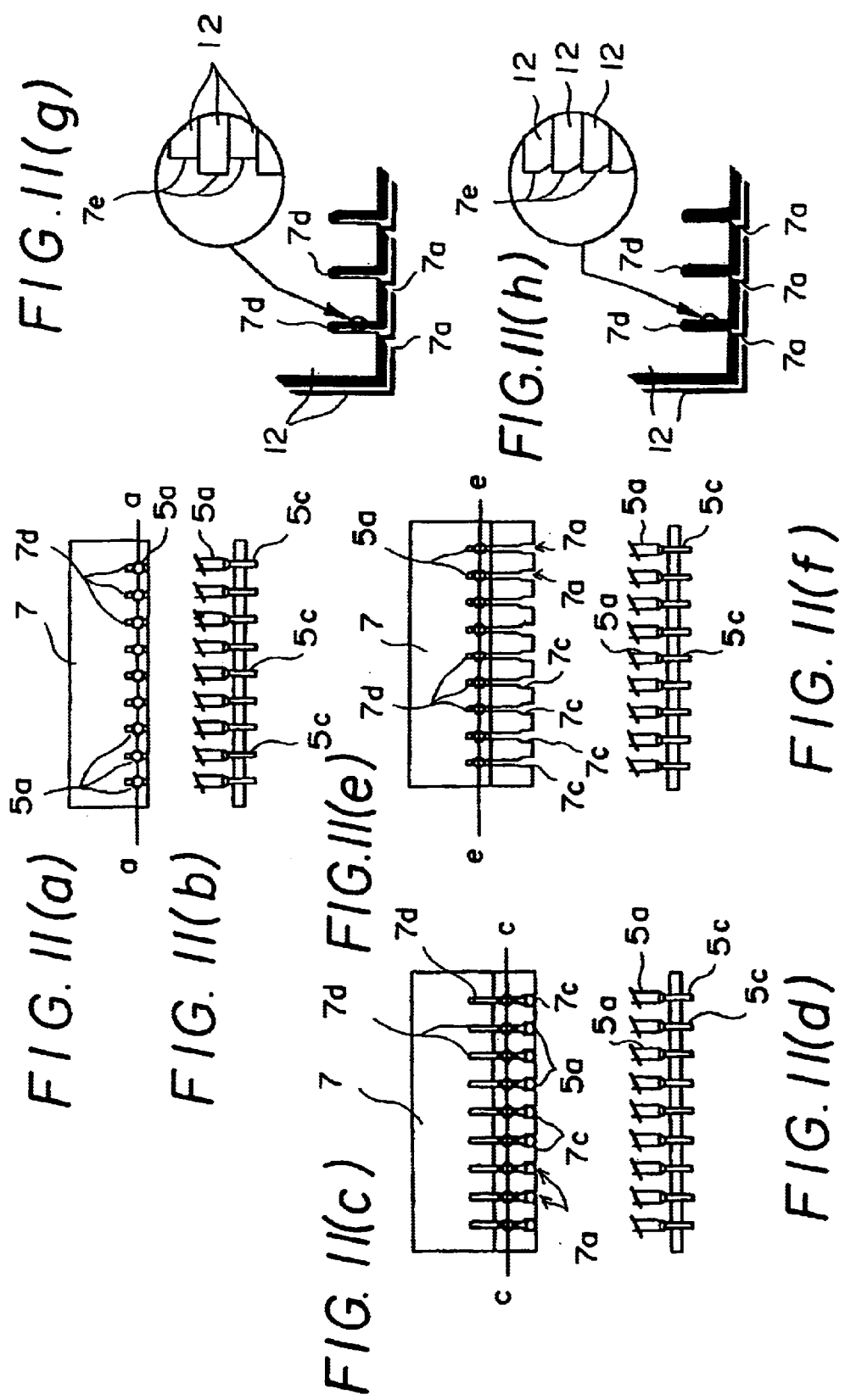

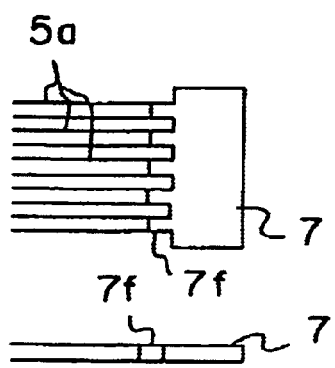
FIG. 12(a)
FIG. 12(b)
FIG. 12(c)
FIG. 12(d)
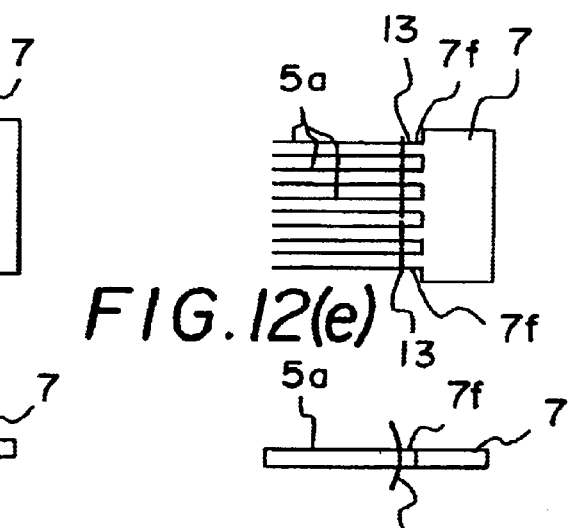
FIG. 12(e)
FIG. 12(f)

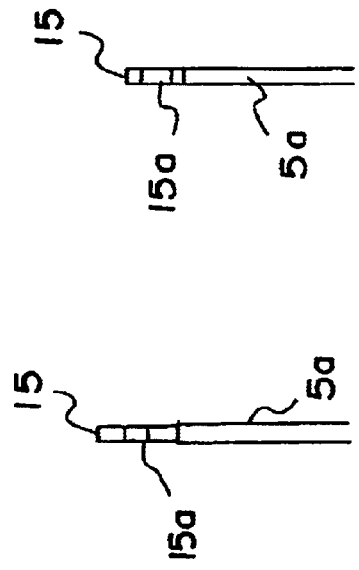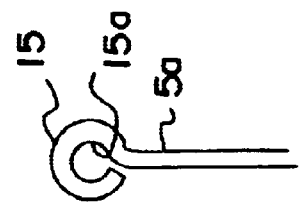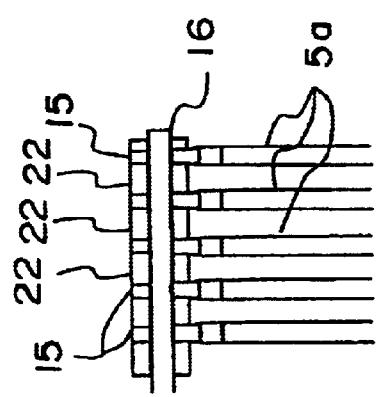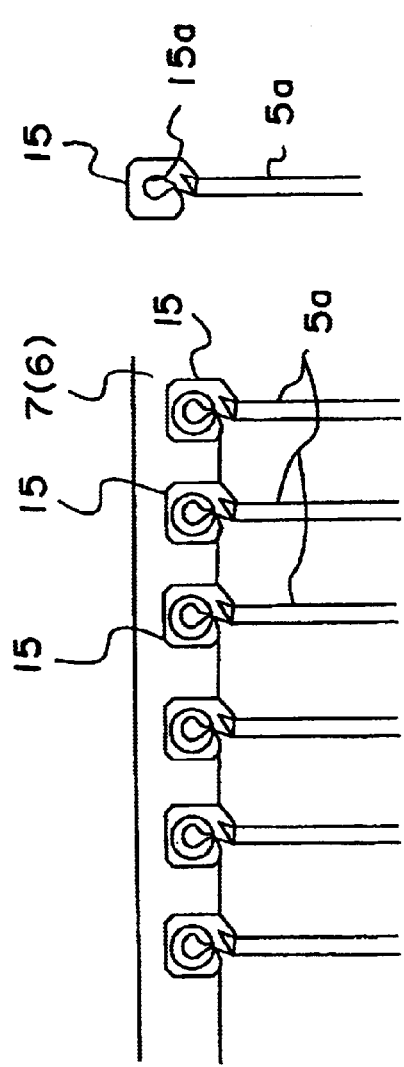

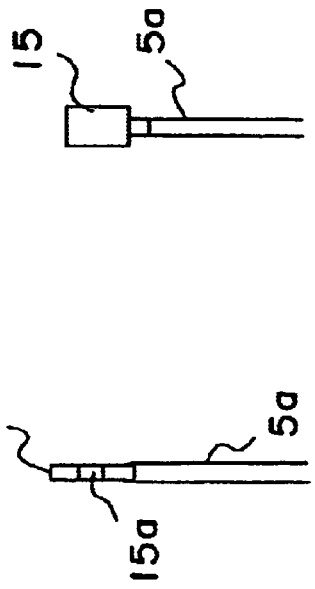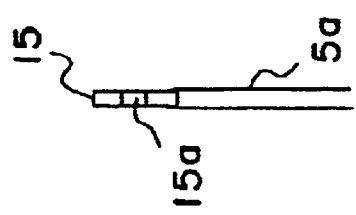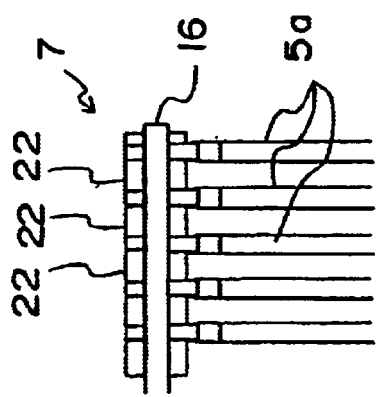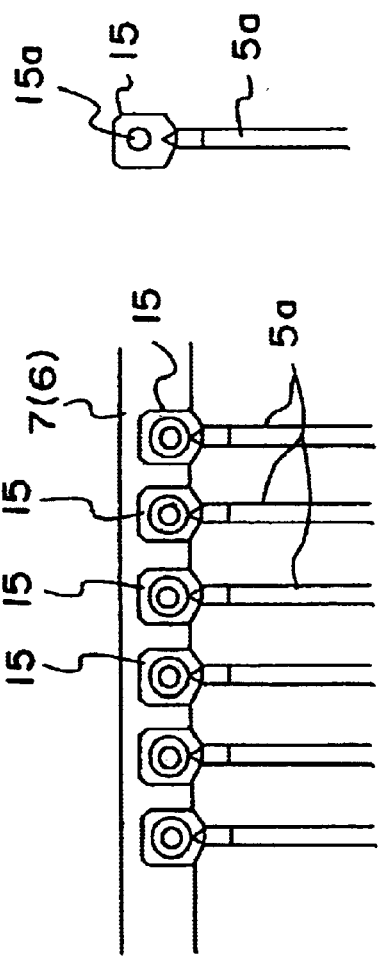

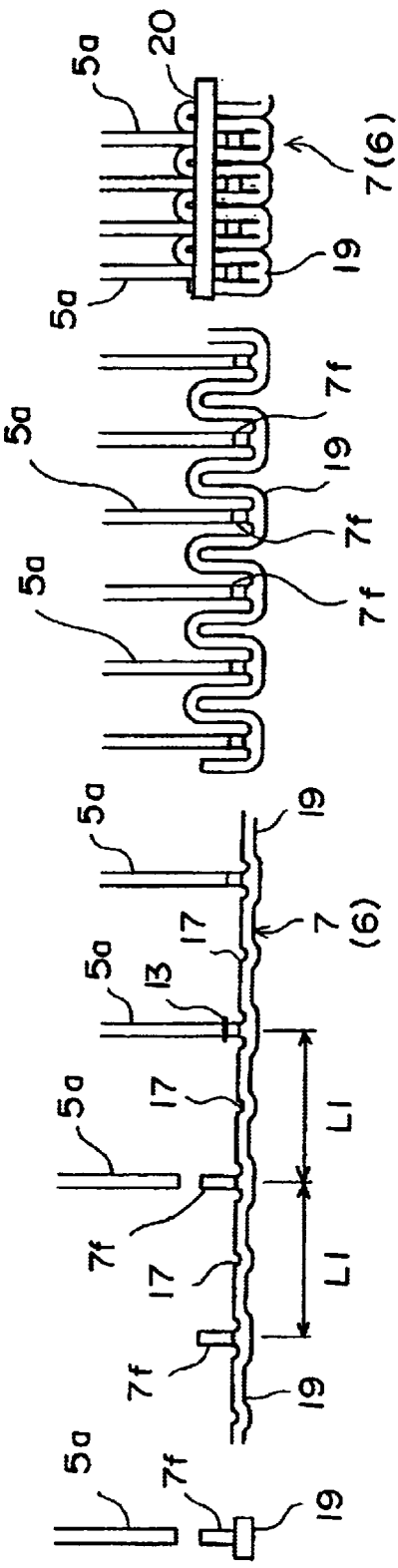

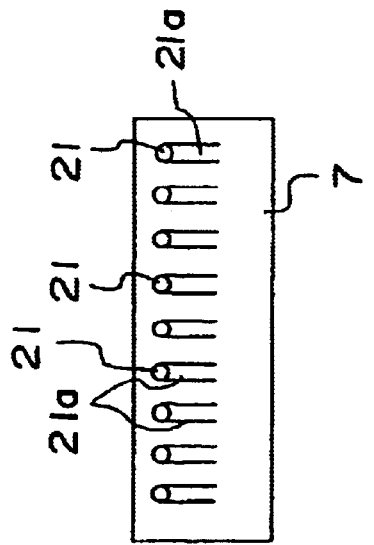
FIG. 16(a)
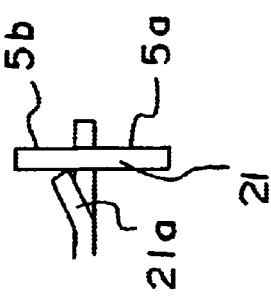
FIG. 16(b)
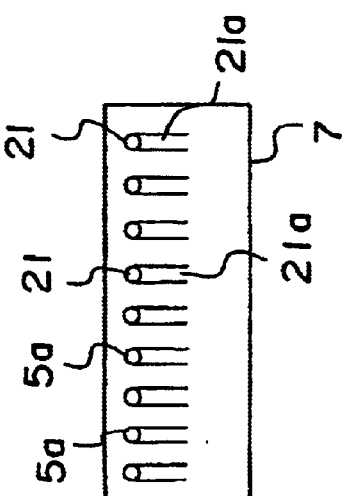
FIG. 16(c)
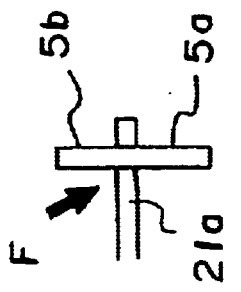
FIG. 16(d)
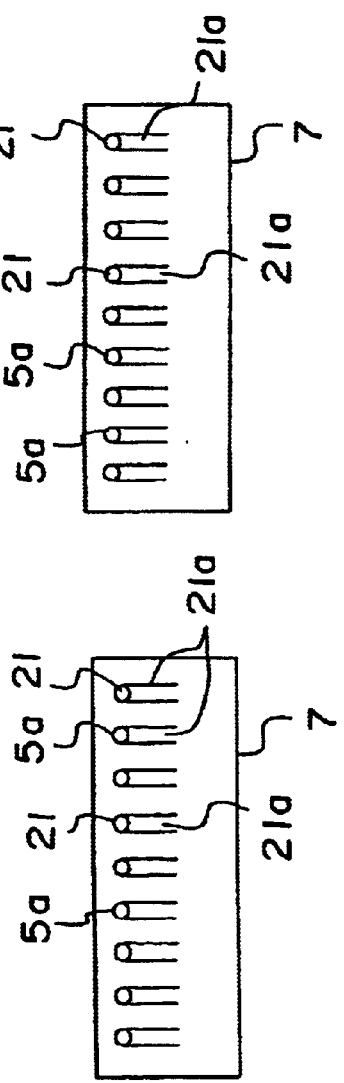
FIG. 16(e)
FIG. 16(f)

THREE PHASE MOTOR

BACKGROUND OF THE INVENTION

1. Field of the Invention

The invention relates to a structure for connecting neutral conductors in a stator winding of a three-phase motor.

2. Description of Related Art

An example of a conventional structure for connecting neutral conductors in a stator winding of a three-phase motor is shown in FIGS. 1 and 2. Neutral terminal portions 1a of coil conductors 1 in a stator winding of a three-phase motor are connected to each other at points 1b as shown in FIG. 1. The neutral terminal portions are connected to each other by means of a mechanical connection such as lapping and crimping, soldering, brazing, welding and the like. The thus connected neutral terminal portions and the mechanically connected neutral points 1b are disposed, as shown in FIGS. 1 and 2, juxtaposed at one end of the coil assembly 5 extending from the stator core 3 in the direction of the axial center of the stator 2 (i.e. the lateral direction in FIG. 2). This positioning of the connected neutral terminal portions 1a and mechanical connections 1b at the end of the coil assembly increases the axial length of the motor in the lateral direction in FIG. 2.

When the number of the coils wound in parallel is increased as in a motor for an electric vehicle, the larger the bundle of neutral conductors and neutral points at which the neutral conductors are connected, resulting in significant increase in the axial length of the motor. Since the space allowed for mounting a motor to an electric vehicle or the like is limited, it is desired that the axial length of the motor be as short as possible.

SUMMARY OF THE INVENTION

In view of the above, it is an object of the present invention to provide a three-phase motor enabling connection of neutral conductors without increasing the axial length of the motor.

To achieve the above construction, according to the invention, a structure is provided for connecting neutral conductors in a three-phase motor containing a stator core in which a coil assembly including three-phase coils is disposed and the neutral end portions of conductors of each coil are connected to each other so as to form neutral points. The three-phase motor is structured such that the neutral end portions of the conductors of the respective coils pass from the inside toward the outer periphery side of the coil assembly one by one where the neutral end portions are connected to a bus bar formed of a conductive material provided on the outside of the coil assembly. Therefore, bundle of connections of the neutral conductors and the connecting points are no longer disposed adjacent in the direction of the axial center, thereby eliminating the increase in axial length of the motor due to the connected neutral end portions of the coil conductors.

According to a preferred embodiment of the invention, connecting portions are formed on the bus bar for connecting the neutral end portions of the coil. Based on this structure, the neutral end portions of the coil conductors can be connected to the bus bar efficiently since the conductors can be connected, one by one, to the bus bar connecting portions.

According to another preferred form of the invention, a plurality of terminal members are detachably provided on the bus bar, and the connecting portions at which the neutral end portions of the coil conductors are connected are formed on terminal end members connected to the bus bar. Based on this structure, a plurality of neutral end portions of the coil conductors can be connected to the bus bar easily by connecting the conductors via the terminal members.

According to a further preferred form of the invention, the connecting portions are formed with slits. Based on this structure, good workability is achieved since the neutral end portions of the coil conductors can be connected by merely inserting tips of the neutral end portions into the slits.

According to another further preferred form of the invention, the connecting portions are formed with holes. Based on this structure, good workability is achieved since the neutral conductors can be connected by merely inserting tips of the neutral end portions of the coil conductors into the holes.

According to still another further preferred form of the invention, steps are formed in the connecting portions, and an electrical connection is made between the connecting portions and the neutral end portions of the coil conductors by breaking or penetrating an insulative coating on the conductors utilizing contact pressure between the steps and the conductors. Based on this structure, a high efficiency of connection work is achieved since the coating of the neutral end portions of the coil conductors can be broken by utilizing the steps.

According to another preferred form of the invention, the steps are formed from a cross sectional portion of a plurality of laminated thin sheets. Based on this structure, the steps can be formed easily by laminating the thin sheets, which is convenient.

According to still another preferred form of the invention, the steps are formed with a hole into which the neutral end portions of the coil conductors are inserted and a leaf spring formed with the tip thereof facing the hole. Based on this structure, the coating can be broken by engagement with the tip of the leaf spring.

According to yet another preferred form of the invention, the bus bar is formed of a plate-shaped member formed in an arc along the outer periphery portion of the stator core. Based on this structure, the bus bar can be disposed utilizing a space in the outer periphery portion of the stator core.

According to yet still another preferred form of the invention, a plurality of bus bars are installed on the outer periphery portion of the stator core. Based on this structure, providing a plurality of bus bars allows a plurality of three-phase winding coils to be accommodated.

According to another preferred form of the invention, the neutral end portions of the coil conductors are aligned along a plane perpendicular to the axial direction of the stator core. Based on this structure, the space that the neutral end portions of the coil conductors occupy in the direction of the core axis direction is kept to a minimum, thereby preventing the axial length of the motor from becoming longer.

According to another preferred form of the invention, a plurality of neutral end portions of the coil conductors are crimped in an aligned form by means of crimping members and connected to the bus bar via the crimping members. Based on this structure, the neutral end portions of the coil conductors can be arranged in a line efficiently, thereby contributing to more efficient assembling.

According to another preferred form of the invention, the three-phase motor comprises includes terminal members at the tips of the neutral end portions of the coil conductors, and is structured such that the neutral end portions of the coil conductors are connected to the bus bar via the terminal members. Based on this structure, the neutral end portions of the coil conductors can be easily connected to the bus bar via the terminal members.

According to another preferred form of the invention, the width of the bus bar in the axial direction of the stator is formed smaller than the width of the coil assembly in the axial direction of the stator core. Based on this structure, the bus bar does not project from the coil assembly outward in the axial direction, preventing the axial length of the motor being extended due to neutral connection points.

BRIEF DESCRIPTION OF THE DRAWINGS

FIGS. 7(a), 7(b), 7(c) and 7(d) are plan views a plurality of examples of bus bars;

FIGS. 8(a), 8(b), 8(c) and 8(d) illustrate an example of a method for connecting the neutral end portions of the coil conductors to a terminal member, wherein FIG. 8(a) is a plan view, FIG. 8(b) is a front view of FIG. 8(a), FIG. 8(c) is a plan view, and FIG. 8(d) is a front view of FIG. 8(c);

FIGS. 9(a), 9(b), 9(c), 9(d), 9(e), 9(f), 9(g), 9(h) and 9(i) illustrate another example of a method for connecting the neutral end portions of coil conductors and a terminal member, wherein FIG. 9(a) is a plan view, FIG. 9(b) is a front view of FIG. 9(a), FIG. 9(c) is a side view of FIG. 9(b), FIG. 9(d) is a front view, FIG. 9(e) is a sectional view of FIG. 9(d), FIG. 9(f) is a front view, FIG. 9(g) is a sectional view of FIG. 9(f), FIG. 9(h) is a front view, and FIG. 9(i) is a sectional view of FIG. 9(h);

FIGS. 10(a), 10(b), 10(c), 10(d), 10(f), 10(g) and 10(h) illustrate still another example of a method for connecting the neutral end portions of the coil conductors and a terminal member, wherein FIG. 10(a) is a plan view, FIG. 10(b) is a front view of FIG. 10(a), FIG. 10(c) is a plan view, FIG. 10(d) is a front view of FIG. 10(c), FIG. 10(e) is a plan view, FIG. 10(f) is a front view of FIG. 10(e), FIG. 10(g) is a plan view, and FIG. 10(h) is a front view of FIG. 10(g);

FIGS. 11(a), 11(b), 11(c), 11(d), 11(e), 11(f), 11(g) and 11(h) illustrates yet another example of a method for connecting the neutral end portions of the coil conductors and a terminal member wherein FIG. 11(a) is a plan view, FIG. 11(b) is a sectional view of FIG. 11(a) taken along a—a, FIG. 11(c) is a plan view, FIG. 11(d) is a sectional view of FIG. 11(c) taken along c—c, FIG. 11(e) is a plan view, FIG. 11(f) is a sectional view taken along e-e, FIG. 11(g) is an enlarged perspective view of a wire insertion groove portion of the terminal member, and FIG. 11(h) is an enlarged perspective view of another example of a wire insertion groove portion of the terminal member;

FIGS. 12(a), 12(b), 12(c), 12(d), 12(e) and 12(f) illustrate still another example of a method for connecting the neutral end portions of the coil conductors and a terminal member wherein FIG. 12(a) is a plan view, FIG. 12(b) is a front view of FIG. 12(a), FIG. 12(c) is a plan view, FIG. 12(d) is a front view of FIG. 12(c), FIG. 12(e) is a plan view, and FIG. 12(f) is a front view of FIG. 12(e);

FIGS. 13(a), 13(b), 13(c), 13(d), 13(e) and 13(f) illustrate another example of a method for connecting the neutral end portions of the coil conductors and a terminal member or the bus bar, wherein FIG. 13(a) is a front sectional view, FIG. 13(b) is a plan view of still another example FIG. 13(c) is a front view of the wire end portion, FIG. 13(d) is a side view of FIG. 12(c), FIG. 13(e) is a side view of the wire end portion, and FIG. 13(f) is the side view of FIG. 13(e);

FIGS. 14(a), 14(b), 14(c), 14(d) and 14(e) illustrate still another example of a method for connecting the neutral end portions of the coil conductors and the terminal member, or the bus bar, wherein FIG. 14(a) is a sectional view, FIG. 14(b) is a plan view of still another example, FIG. 14(c) is front view of the wire end portion, FIG. 14(d) is a side view of FIG. 14(c), and FIG. 14(e) is a front view showing another example of the wire end portion;

FIGS. 15(a), 15(b), 15(c) and 15(d) illustrate steps of a process showing still another example of a method for connecting the neutral wire conductors and terminal member or the bus bar; and FIGS. 16(a), 16(b), 16(c), 16(d), 16(e) and 16(f) illustrate steps of a process showing yet another example of a method for connecting the neutral end portions of the coil conductors and the subterminal, wherein FIG. 16(a) is a plan view, FIG. 16(b) is a sectional view of FIG. 16(a), FIG. 16(c) is a plan view, FIG. 16(d) is a sectional view of FIG. 16(c), FIG. 16(e) is a plan view, and FIG. 16(f) is a sectional view of FIG. 16(e).

DETAILED DESCRIPTION OF PREFERRED EMBODIMENTS

Figure 1:
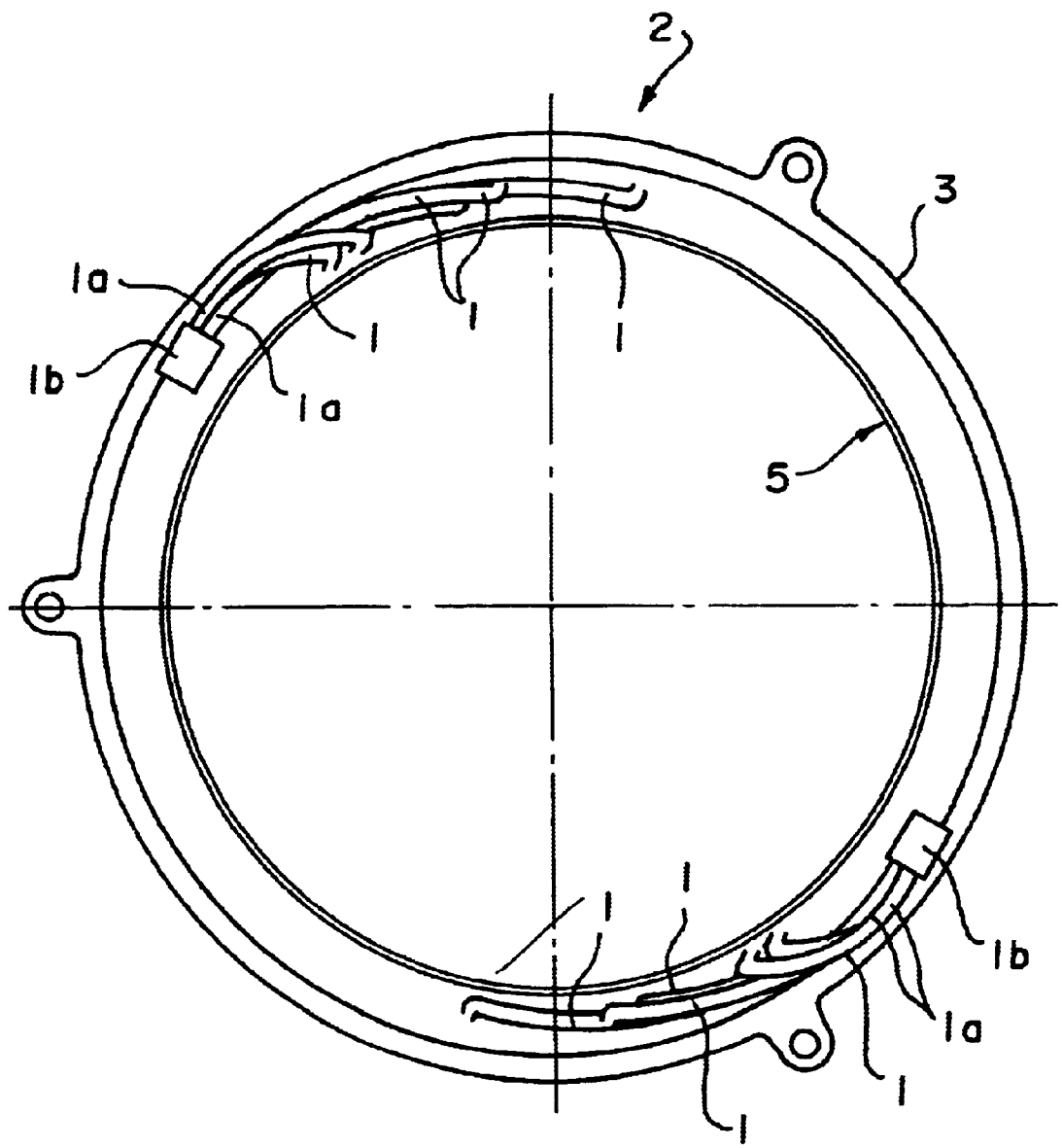
FIG. 1 is a front view of an example of a stator portion of a motor illustrating the structure of the connection of neutral end portions of the coil conductors in a conventional stator winding in a three-phase motor.

Hereinafter, referring to the drawings, several preferred embodiments of the present invention are explained.

Figure 3:
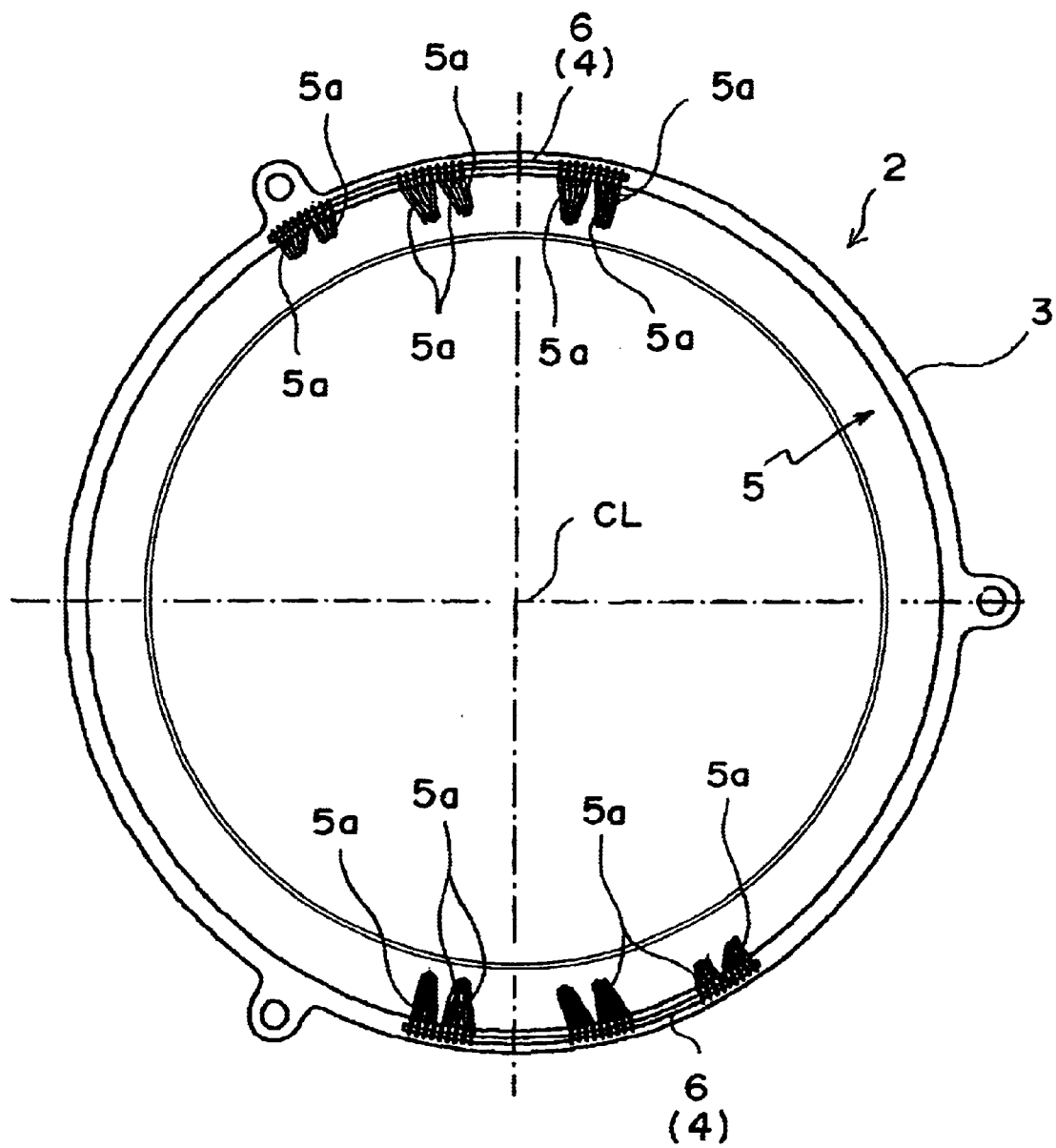
FIG. 3 is a front view of an example of a stator of a three-phase motor according to the present invention.
Figure 4:
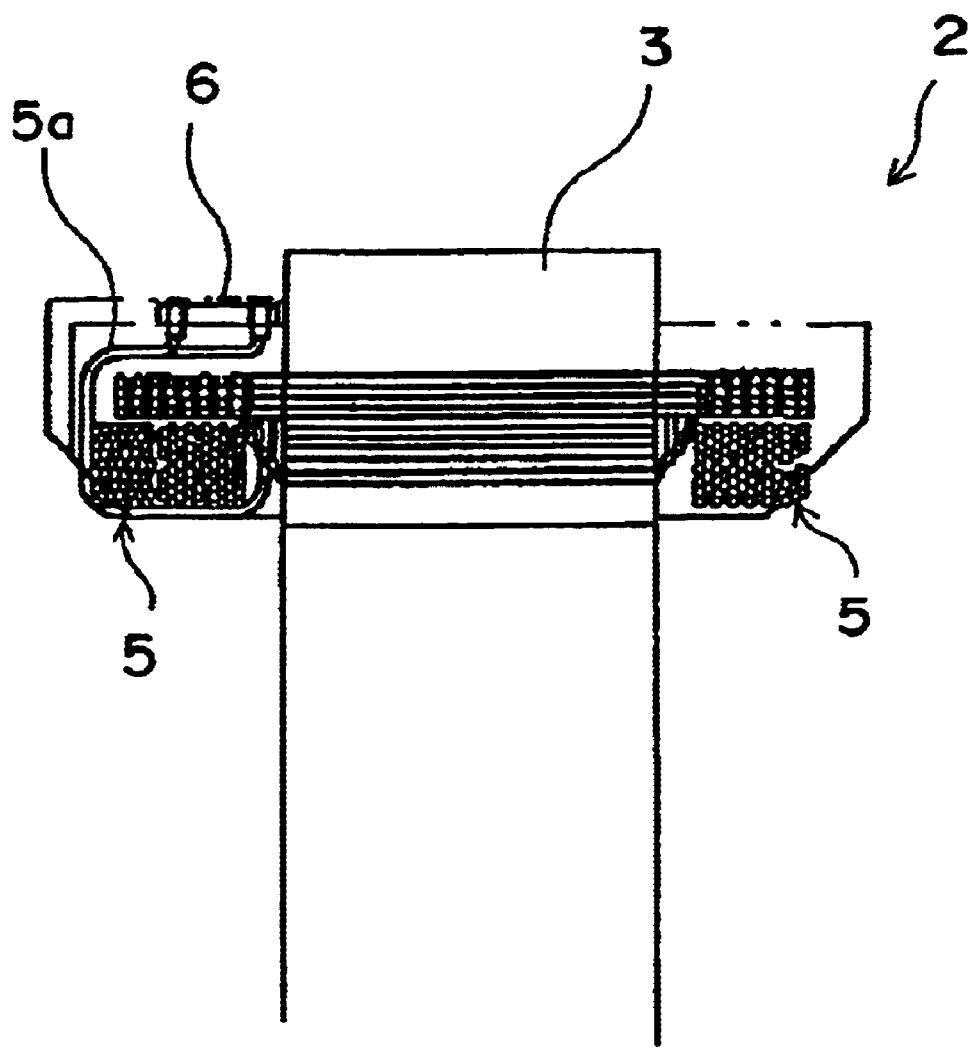
FIG. 4 is a side view of a broken away winding portion of FIG. 3.
Figure 5:
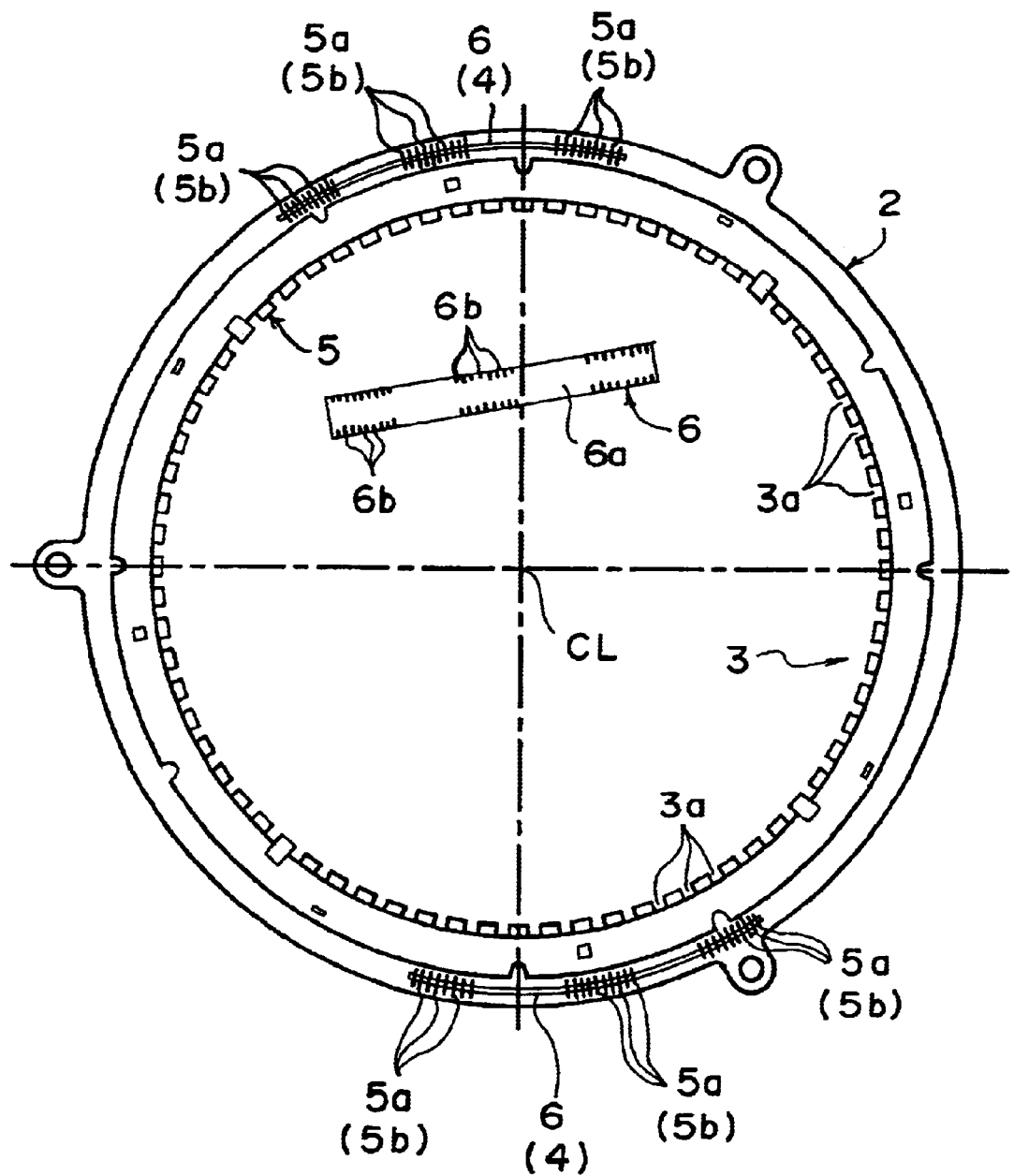
FIG. 5 is a front view showing an example of another mode of connection of the neutral end portions of the coil conductors.

A stator 2 of a three-phase motor has a stator core 3 formed in a ring shape, as shown in FIGS. 3 to 5. Inside the stator core 3, slots 3a receiving the stator coils are formed radially centered on an axis CL of the stator core 3. Two coil assemblies 5 having three phases, phase U, phase V and phase W, are installed by insertion in respective slots 3a. Neutral end portions of the coil conductors 5a constituting each phase of each coil assembly 5 are pulled or positioned, one by one, in such a manner that end portions 5b thereof pass or extend in the radial direction from the inner periphery side of the coil assembly 5 to the outer periphery side to the coil assembly, with the neutral end portions 5a of the coil conductors not overlapping each other as shown in FIGS. 3 and 4.

As shown in FIG. 3, the neutral end portions of the coil conductors 5a are aligned facing the outer periphery side of the stator core 3 for each phase of each coil assembly 5. The neutral end portions of the coil conductors 5a for each phase are connected to a bus bar 6 provided on the outer periphery portion of the coil 5 of the stator core 3, such that the bus bar 6 forms a neutral point of the three-phase coil assembly 5. Two bus bars 6 are provided on the stator 2, corresponding to each of the coil assemblies 5.

The bus bar 6, as shown in FIG. 7(b), has a strip-shaped main body 6a formed of a conductive material. The main body 6a is formed by being bent in an arc as shown in FIG.

5 with the longitudinal direction thereof being along the outer periphery portion of the stator core 3, as shown in FIGS. 4 and 5. On both upper and lower sides of the main body 6a in FIG. 7(b), a plurality of connection slits 6b are formed located at three separate positions, corresponding to each phase of the coil assembly 5. Each tip of the neutral end portions of the coil conductors 5a is pressed into each connection slit 6b, one by one, separately for each phase, so as to establish electric contact with the bus bar 6.

Figure 6:
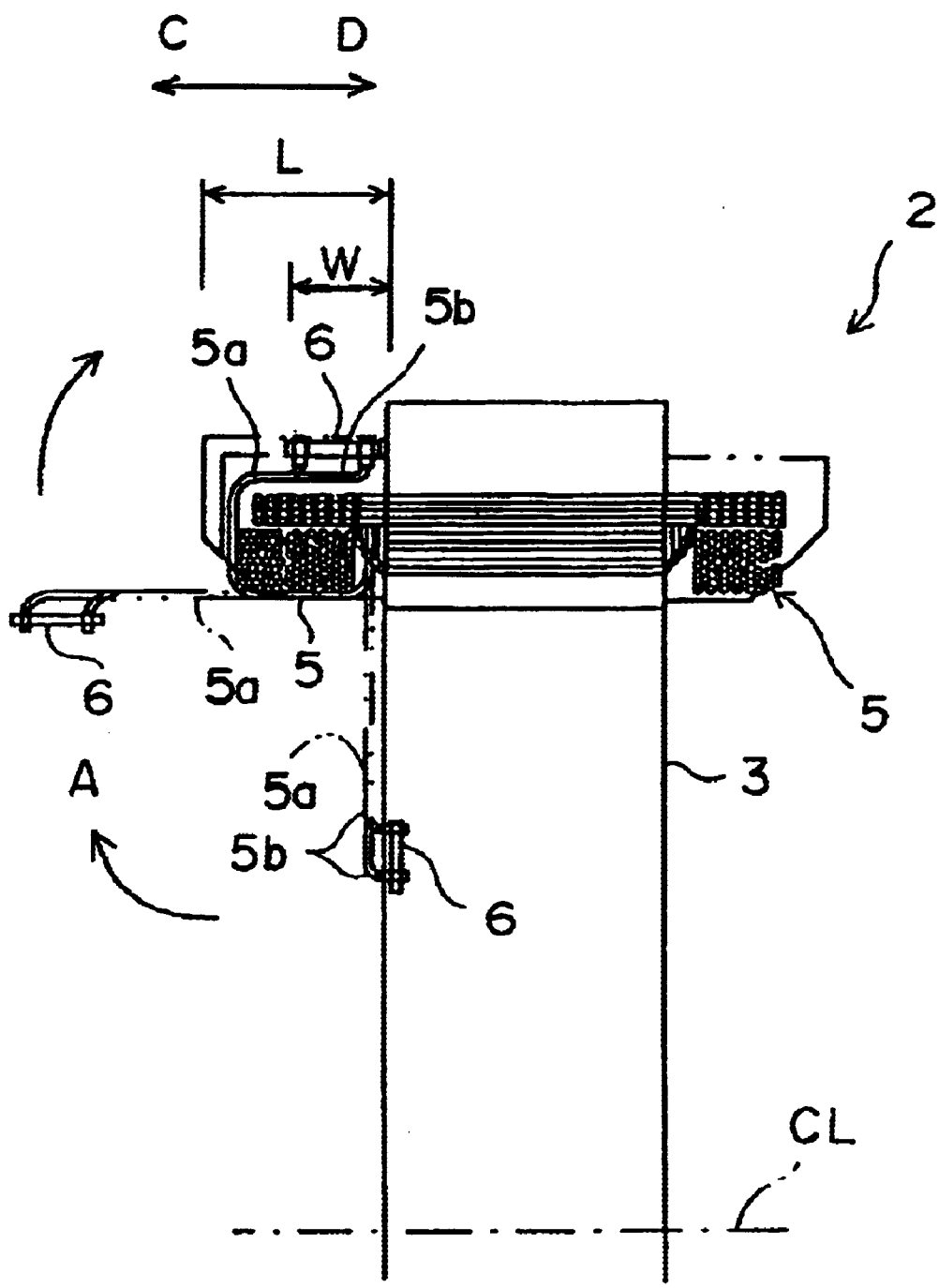
FIG. 6 is a side view of a broken away winding portion of FIG. 5.

To form a stator 2 of the aforementioned structure with the coil assembly 5 being assembled and disposed in the stator 2 during assembly of the three-phase motor, a three-phase coil assembly 5 is installed in the corresponding slits 3a of the stator core 3. Then a neutral point is formed by connecting the neutral end portions of the coil conductors 5a of each coil in the coil assembly 5 together. After the coils of the coil assembly 5 are installed by being inserted in the corresponding slots 3a, the bus bar 6 is disposed in the inner periphery portion of the stator core 3, as shown in FIGS. 5 and 6. Then each of the neutral end portions of the coil conductors 5a is pulled from the coil assembly 5 to extend radially inward from the inner periphery portion of the stator core 3, and a tip portion 5b of each neutral end portion of the coil conductors 5a is forcibly pressed into a connection slit 6b of the bus bar 6. During the forcing of each neutral end portion of the coil conductor 5a into the connection slit 6b, the connection slit 6b breaks or penetrates an insulating coating of the neutral end portion of the coil conductor 5a so as to establish an electric connection between the neutral end portion of the coil conductor 5a and the bus bar 6. A width of each connection slit 6b is formed slightly smaller than the diameter of a metal wire or conductive core element of the neutral end portions of the coil conductor 5a so that the conductive core element of the neutral end portion of the coil conductor 5a being inserted into the connection slit 6b is plastically deformed to be reliably mechanically engaged with the metal of the connection slit 6b.

After all of the neutral end portions of the coil conductors 5a in each phase of the coil assembly 5 are connected one by one to connection slits 6b of the single bus bar 6, the bus bar 6 and connected neutral end portions of the coil conductors 5a of the coil assembly 5 are moved, in the direction of arrow A as shown in FIG. 6, axially outward and radially upward around the axial end of the stator core 3 and the end of the coil assembly 5 such that the plurality of connected neutral end portions of the coil conductors 5a pass over the end of the coil assembly 5 to the outer periphery of the coil assembly 5 to be successively attached to or held in a position at an axial end edge of the stator core 3 at the periphery of the stator core. Thus, as shown in FIG. 3, a plurality of neutral end portions of the coil conductors 5a are connected to the bus bar 6 to form a neutral point of the coil assembly 5 with a minimum increase in the axial length of the assembly of the coil assembly 5 and stator core 3.

Figure 2:
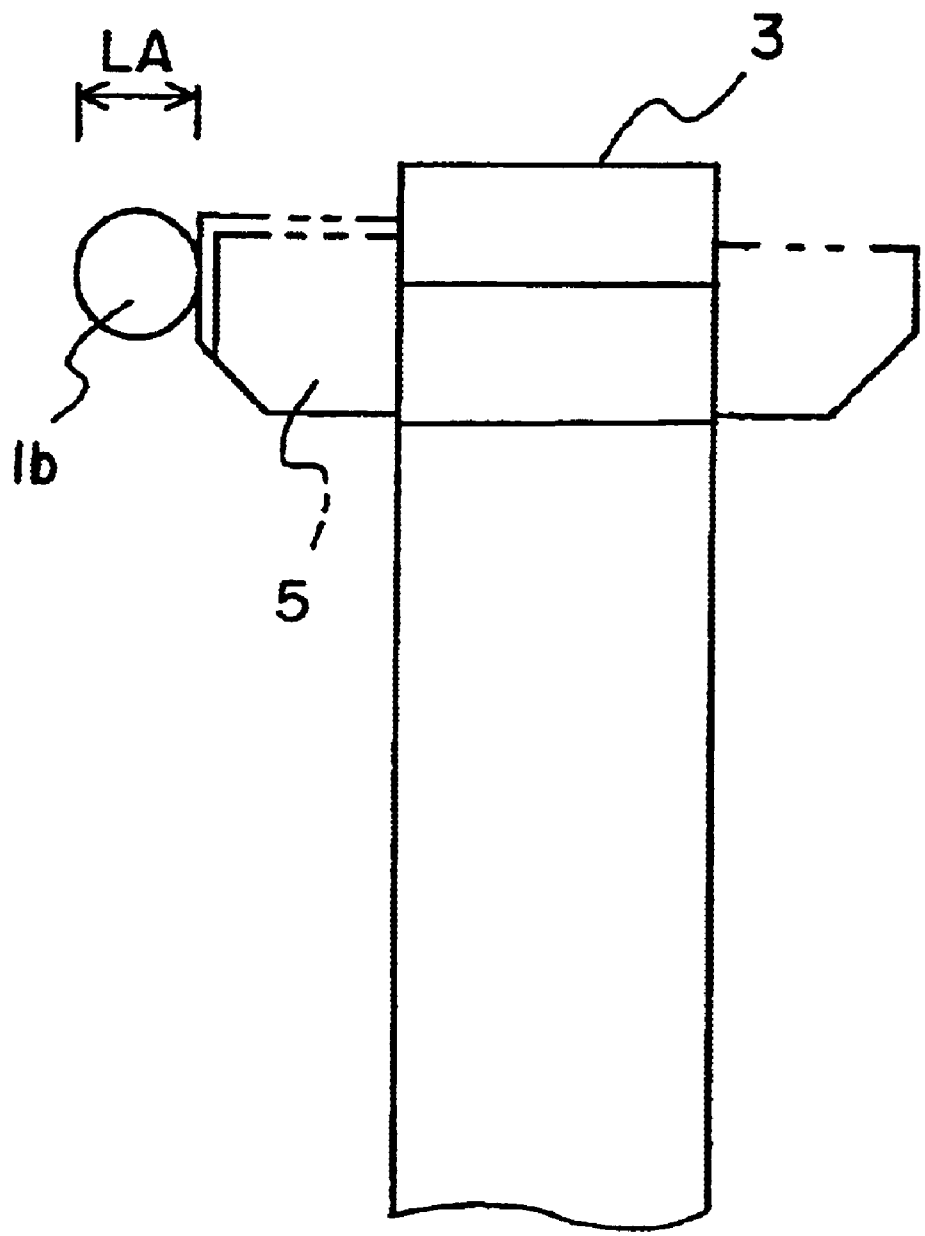
FIG. 2 is a side view of a broken away winding portion of FIG. 1.

The width W of the bus bar 6 in the axial direction of the stator is, as shown in FIG. 6, shorter than the distance L that the end of the coil assembly 5 extends from the lateral edge of the stator core 3 in the axial direction. Therefore, the bus bar 6 does not project beyond the coil assembly 5 in the axial direction, i.e. the direction shown by arrows C and D. Thus, the bus bar 6 forming the neutral point does not increase the axial length of the motor in contrast to the prior art conventional neutral points 1b of FIGS. 1 and 2.

Further, the tips 5b of the neutral end portions 5a of the coil conductors are connected to slots in each opposite edge of the bus bar 6 at positions spaced circumferentially around the stator assembly, as shown in FIGS. 3 and 6, so that the neutral end portions 5a of the coil conductors lie parallel (i.e. not bundled) forming a flat arrangement of conductors having a thickness equal to the thickness of one conductor as the neutral end portions 5a pass around the end of the coil assembly 5 from the inside to the outside of the coil assembly 5. Therefore, the neutral end portions 5a of the coil conductors cover the end of the coil assembly 5 but only increase the axial length of the stator 2 and motor by the thickness of a single conductor.

When a plurality of coil assemblies 5 are employed in the stator of a motor, the bus bars 6 are disposed for each coil assembly 5 so as to be positioned on the outer periphery portion of the coil assembly, as shown in FIG. 3, at circumferential spaced positions around the stator.

The bus bar 6 may take various shapes as shown in FIGS. 7(a)–(d). Since there is no need to differentiate phases when connecting the neutral end portions 5a of the coil conductors, the connection slits 6b can be formed, at constant intervals, and each neutral end portion 5a can be connected to any convenient connection slit 6b without differentiating the phase of the neutral end portion 5a being connected to the connection slit.

Further, as shown in FIG. 7(c), the connection slits 6b can be formed on only one of the sides of the bus bar 6, making the width WA of the bus bar 6 smaller, though the entire length thereof becomes longer. Further, as shown in FIG. 7(d), a modified bus bar 6 has a plurality of short terminal members 7 made of a conductive material in which connection slits 7a are formed similar to the connection slits 6a for connecting the neutral end portions of the coil conductors to the bus bar. The terminal members 7 are removably connected to the bus bar 6 by means of screws 7b or the like. In this case, after the bus bar 6 has been attached to the outer periphery side of the stator core 3, the neutral end portions of the coil conductors may be connected to the slits 7a of the terminal members 7 which are then subsequently connected to the bus bar 6. This arrangement improves workability by obviating the need to move a bus bar 6 with a large number of connected neutral end portions 5a from the inside to the outside of the stator core 3 while bending the neutral end portions of the coil conductors 5a around the end of the coil assembly.

In addition to an aforementioned press-in method, various other methods can be employed for connecting the neutral end portions 5a of the coil conductors to a bus bar 6 or to terminal members 7, such as by crimping, welding, brazing, or soldering.

Figure 8A:
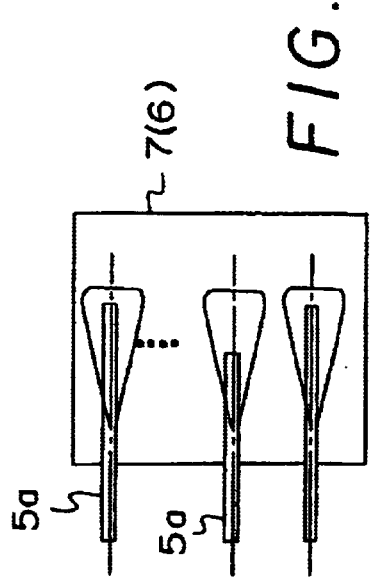
Figure 8C:
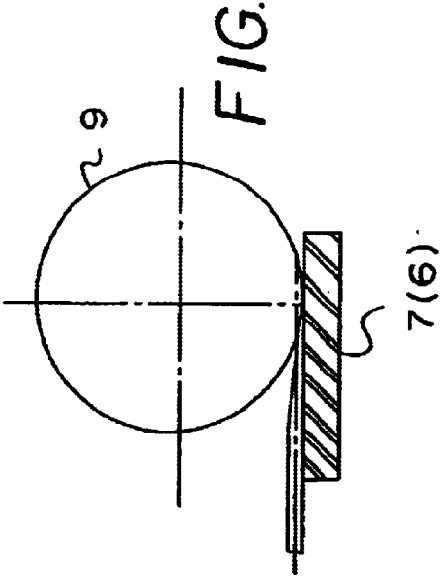
Figure 8B:
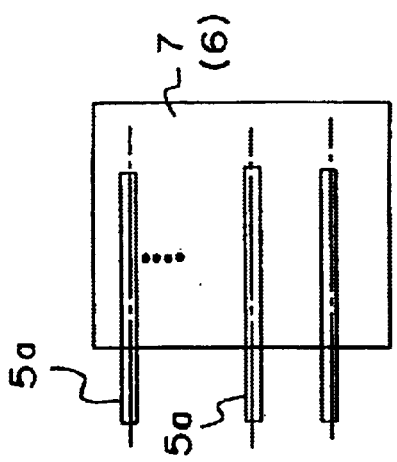
Figure 8D:
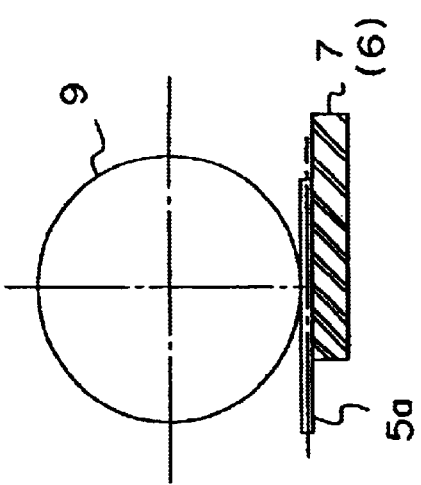

FIGS. 8(a)–(d) show an alternative method for connecting the neutral end portions 5a of the coil conductors to a terminal member 7. Although, the method of FIGS. 8(a)–(d) is illustrated for the connection of the neutral end portions 5a to a terminal member 7, this method can also by applied to the connection of neutral end portions directly to a bus bar 6. In FIG. 8(a), a plurality of tips of aligned neutral end portions 5a, from which tips the insulating coatings have been removed or peeled, are laid on one surface of a terminal member 7. Then as shown in FIGS. 8(b), 8(c) and 8(d), the neutral end portions 5a are pressed onto a side of the terminal member 7 by means of a pressing roller 9 so that the conductive core elements of the neutral end portions 5a are plastically deformed to be crimped, bonded, cold welded or hot welded with or without heat or welding current to the terminal member 7.

In a further method of connecting neutral end portions 5a to a terminal member or a bus bar, the tips of an aligned plurality of neutral end portions 5a of coil conductors are retained by being sandwiched between members 10, 11 made of a conductive material as shown in FIGS. 9(d) and 9(e). In this state, the crimping members 10, 11 are compression molded in the vertical direction in FIGS. 9(f) and 9(g). Soldering or resistance welding may also be used to connect the members 10, 11 to the neutral end portions 5a so that the members 10, 11 form a terminal member 7. As shown in FIGS. 9(h) and 9(i), crimping a central portion of the members 10, 11 can be used to form a terminal member 7 connected to the neutral end portions 5a; during crimping the insulating coatings on the neutral end portions are broken so as to establish an electrical connection and to from a strong mechanical connection between the neutral end portions 5a and the terminal member 7. A terminal member formed by the crimping of central portion of the members 10, 11 is shown in FIGS. 9(a)–(c), and can be connected to a bus bar 6 or the like as shown in FIG. 7(d), to form the neutral points.

In a further method, as shown in FIGS. 10(a)–(f), tips of neutral end portions 5a of the coil conductors, with the insulative coatings removed at the tips, can be inserted one by one into respective connection slots 7a of the terminal member 7 as shown in FIGS. 10(c) and 10(d). Next, as shown in FIGS. 10(e) and 10(f), the end portions of fingers between adjacent connection slots 7a are be plastically deformed so as to close the space between the fingers and crimp the fingers to the conductor tips. FIGS. 10(a) and 10(b) illustrated crimping of the fingers between adjacent slots 7a so as to plastically deform the metal cores of the conductor tips and to form strong mechanical and electrical connections between the neutral end portions and the terminal member. As shown in FIGS. 10(g), and (h), the tips of the neutral end portions 5a of the coil conductors without the insulative coatings removed may be crimped to cause the fingers to break or penetrate through the insulative coatings and form strong electrical and mechanical connections. Each terminal member 7 can be attached to a bus bar via installation holes 7b, 7b so as to form the neutral points.

Further, a terminal member 7 can be formed, as shown in FIGS. 11(g) and 11(h), of a plurality of laminated thin sheets 12, in which the connection slits 7a of the terminal member 7 may be formed, as shown in FIGS. 11(c) and 11(d), in a funnel shape or tapered with insertion openings 7c larger than the diameters of the insulation coated neutral end portions 5a of the coil conductors, and inside slot portions 7d slightly smaller than the diameters of the inner core wire of the neutral end portions of the coil conductors 5a. In FIG. 11(g) the narrow inside portions of the connection slits 7a are formed with,edges of adjacent lamination sheets being offset such that edge portions of the slits 7a have steps 7e. In FIG. 11(h) the narrow inside portions of the connection slits 7a have thinned or nipped edges on each lamination sheet formed by the blanking of the lamination sheet to form steps 7e separated by recess portions generated on the fracture surface when blanked.

In terminal members or bus bars with slots having edges in the thickness direction, pressing each of the neutral end portions 5a of the coil conductors with insulation coating into the narrow slot portion 7d via the insertion slot portion 7c results in the insulation on the neutral end portions being deformed or flattened as the conductor moves through the tapered insertion slot portion 7c to the narrow inside slot portion 7d. This enlarges the contact area with the narrow slot portions 7d and makes the insulation coating thinner, such that the insulation coating is broken by the steps 7e formed by each of the thin plates 12 and establishes an electric connection between each of the core wires 5c of the neutral end portions 5a of the coil conductors and the terminal member 7. The tapered slot insertion portions 7c can be used to grip and hold the neutral end portions 5a of the coil conductors as a preliminary forming jig for the neutral end portions of the coil conductors during assembly.

After the neutral end portions 5a of the coil conductors have been forced to the bottom ends of the slots 7a as shown in FIGS. 11(e) and 11(f), the edge portion of the terminal member 7 having the insertion slot portions 7c is removed by cutting to form the terminal member structure shown in FIGS. 11(a) and 11(b). The remaining finger portions between the connection slits 7a can be plastically deformed and closed as shown in FIGS. 10(a) and (b) to increase the strength of the electrical and mechanical connection between the terminal member 7 and the neutral end portions 5a. Attaching the terminal member 7 to the bus bar 6 forms the neutral point.

In a still further method as shown in FIGS. 12(a)–(f), the core wires of the neutral end portions 5a of the coil conductors are initially aligned end to end with connection protrusions or fingers 7f formed on the terminal member 7 as shown in FIGS. 12(c) and 12(d). Then, as shown in FIGS. 12(e) and 12(f), the tips of the neutral end portions of the coil conductors 5a and the connection projections 7f are brought into contact under a certain pressure so that each of the neutral end portions of the coil conductors 5a and each of the connection projections 7f are bonded or welded together. This bonding can be performed one by one and may or may not include heat or electric current. After bonding, protruding portions of burrs 13 generated by the bonding are removed to produce the terminal member 7 with connected neutral end portions 5a as shown in FIGS. 12(a) and 12(b). The terminal member 7 is then attached to the bus bar 6 to form the neutral point.

In yet another method as shown in in FIGS. 13(a)–(f), a terminal member 15 having a connection hole 15a is attached or formed on the tip of each of the neutral end portions 5a of the coil conductors. As shown in FIG. 13a, a plurality of neutral end portions 5a of the coil conductors are connected to each other by connecting the terminal members 15 and spacers 22 between each pair of terminal members 15 by a connection bolt 16 passing through the connection holes 15a and spacers 22. The plurality of conductor terminal members 15 connected by the connection bolt 16 form a terminal member which may then be connected to a bus bar. Alternatively, as shown in FIG. 13(b), each of conductor terminal members 15 on the neutral end portions of the coil conductors may be connected one by one to bus bar 6 or bus terminal member 7 by a screw, bolt or rivet through the connection hole 15 of the conductor terminal member 15. The terminal member 15 of the neutral end portions 5a of the coil conductor may take various shapes, and may be formed by bending the core wire of the neutral end portion of the coil conductor as shown in FIGS. 13(e) and (f). Further, as shown in FIGS. 14(a)–(e), the terminal member may be formed as a square plate-shaped member and the connection hole 15a may be provided by drilling, punching, or the like through the center of the member.

In another embodiment shown in FIGS. 15(a) and (b), a terminal member or bus bar is formed by a long flat member 19 on which connection protrusions 7f are formed at predetermined intervals L1. Each tip of the core wire of the neutral end portions 5a of the coil conductors with the insulation coating removed is aligned end to end with the tip of a protrusion 7f and then brought into contact under a certain pressure so that the neutral end portions 5a of the coil conductor and the protrusion 7f are press welded together one by one as shown in FIG. 15(b). Burrs 13 generated during the press welding are removed. After welding the neutral end portions 5a to the terminal member 19, the terminal member is bent at notches 17 to form folds of the member 19 between each projection 7f, as shown in FIG. 15(c) Next, as shown in FIG. 15(d), the folds in the member 19 are compressed so that each tip of each neutral end portions 5a is sandwiched from both sides by the folds of the flat 17, and fixed in the compressed state by a fixing band 20.

In a further embodiment as shown in FIGS. 16(a)–(f), an engagement hole 21 is formed for example by drilling or punching in the terminal member 7, and a step is formed at one side of the hole by a tip of a leaf spring 21a punched in the terminal member with the tip slightly projecting upward as shown in FIG. 16(f). The minimum distance D1 between tip of the leaf spring 21a and opposite side of the engagement hole 21 is made slightly smaller than the diameter of the core wire of the neutral end portion 5a of the coil conductor. A neutral end portion 5a with insulation coating is inserted into the engagement hole 21 from a direction opposite to the projection of the leaf spring 21a (from below in FIG. 16(d)) for a predetermined distance against elasticity of the leaf spring 21a elastically deforming the tip of the leaf spring 21a upward in the FIG. 16(d). After insertion of the neutral end portion of the coil conductor 5a through the engagement hole 21 for the predetermined distance, the leaf spring 21a is crimped in the direction as shown by arrow F in FIG. 16(b) This crimping bends the leaf spring into the plane of the terminal member 7 causing the tip of the leaf spring 21a to cut into the insulation coating of the neutral end portion 5a so as to break or penetrate the insulation coating and to electrically connect the leaf spring 21a and the core wire of the neutral end portion 5a. As above mentioned, the neutral end portions 5a of the coil conductors are engaged, one by one, with the engagement holes 21 of the terminal member 7. The terminal member 7 to which a plurality of neutral end portions of the coil conductors are connected is then attached to the bus bar 6 so as to form the neutral point.

The present invention may employ any form of connection as long as the neutral end portions of the coil conductors 5a of the coil assembly 5 of the stator 2 extend radially from the inside toward the outside of the coil assembly 5 and are connected one by one to the bus bar 6 disposed on the outer periphery side of the stator core 3.

In addition to the mechanical connection using screws or the like, various forms of connection can be employed between each of the neutral end portions of the coil conductors 5a and the bus bar 6, such as welding, crimping and the like.

The bus bar is not limited in shape that of a plate, but may be in the shape of a stick or any other shape. It is preferable, however, that the width of the bus bar in the axial direction of the stator (i.e. the directions shown by arrows C and D in FIG. 6) be smaller than the projection amount L of the coil assembly 5 from the stator core 3 in the axial direction of the stator.

Japanese Patent Application No. 2000-39966 filed Dec. 28, 2000 is hereby incorporated herein in its entirety.

What is claimed is:

1. A three phase motor comprising:
   a motor having a stator core and a coil assembly including coils of three phases disposed in the stator core, said coil assembly defining radially inner and outer peripheral sides;
   neutral end portions of the of the respective coils extending from one of said penpheral sides of the coil assembly to the other peripheral side of the coil assembly;
   a bus bar formed of a conductive material on the other peripheral aide of the coil assembly; and
   said neutral end portions of the coil conductors being electrically connected to the bus bar so that the neutral end portions and the bus bar form a neutral point for the three phases.

2. A three phase motor according to claim 1, wherein the bus bar is provided with a connecting portion to which the neutral end portions of the coil conductors are connected.

3. A three-phase motor according to claim 2, wherein the connecting portion includes a slit.

4. A three-phase motor according to claim 2, connecting portion includes a hole.

5. A three-phase motor according to claim 2, wherein the coil conductors include an insulative coating, and the connecting portion includes means for penetrating the insulative coating to electrically join the connecting portion and a conductive core of the neutral end portions of the coil conductors.

6. A three-phase motor according to claim 5, wherein means for penetrating the insulative coating includes steps formed by a cross sectional portion of a plurality of laminated thin metal sheets.

7. A three-phase motor according to claim 5, wherein the means for penetrating the insulative coating includes a step formed by a tip of a leaf spring on one side of a hole in the connecting portion and into which the neutral end portions of the coil conductors are inserted.

8. A three-phase motor according to claim 2, wherein the connecting portion includes a plurality of detachable metal terminal members to which the neutral end portions of the coil conductors are electrically connected.

9. A three-phase motor according to claim 8, wherein each detachable metal terminal member includes a slit for electrically connecting to a neutral end portion.

10. A three-phase motor according to claim 8, wherein each detachable metal terminal member includes a hole for electrically connecting to a neutral end portion.

11. A three-phase motor according to claim 8, wherein the coil conductors have an insulative coating, and each of the detachable metal terminal members includes means for penetrating the insulative coating to electrically connect the metal terminal member to a conductive core of one of the neutral end portions of the coil conductors.

12. A three-phase motor according to claim 11, wherein the means for penetrating the insulative coating includes steps formed from a cross sectional portion of a plurality of laminated thin sheets.

13. A three-phase motor according to claim 11, wherein the means for penetrating the insulative coating includes a step formed by a tip of a leaf spring on one side of a hole in the metal terminal member and into which the neutral end portions of the coil conductors are inserted.

14. A three-phase motor according to claim 1, wherein the bus bar is formed of a plate-shaped member and formed in an arc along the outer periphery portion of the stator core.

15. A three-phase motor according to claim 1, wherein a plurality of bus bars are installed along the outer periphery portion of the stator core.

16. A three-phase motor according to claim 1, wherein the neutral end portions of the coil conductors extend around an end portion of the coil assembly in a parallel arrangement.

17. A three-phase motor according to claim 2, wherein the connecting portion includes a crimping member for crimping a plurality of neutral end portions of the coil conductors arranged in a line.

18. A three-phase motor according to claim 1, further comprising conductor terminal members at the tips of the neutral end portions of the coil conductor, and means for connecting the conductor terminal members to the bus bar.

19. A three-phase motor according to claim 1, wherein a width of the bus bar in the axial direction of the stator is formed smaller than a width of the end of the coil assembly extending in the axial direction from the stator core.

20. A three-phase motor according to claim 1 wherein said neutral end portions are circumferentially spaced around the other peripheral side.

21. A three-phase motor according to claim 1 wherein said neutral end portions are separately inserted into respective slots in said bus bar.

22. A three-phase motor according to claim 1 wherein said neutral end portions extend from the radially inner peripheral side of the coil assembly to the radially outer peripheral side of the coil assembly and wherein said bus bar is on the radially outer peripheral side of the coil assembly.

23. A three-phase motor according to claim 22 wherein said neutral end portions are circumferentially spaced around the radially outer peripheral side.

24. A three-phase motor according to claim 22 wherein said neutral end portions are separately inserted into respective slots in said bus bar.

25. A three phase motor comprising:
a motor having a stator core defining a circumference and a coil assembly including coils of three phases disposed along the circumference of the stator core;
neutral end portions of the conductors of the respective coils spaced along the circumference;
a bus bar formed of a conductive material; and
said neutral end portions of the coil conductors being electrically connected to the bus bar so that the neutral end portions and the bus bar form a neutral point for the three phases.

26. A three-phase motor according to claim 25 wherein said neutral end portions are separately inserted into respective slots in said bus bar.

27. A three-phase motor according to claim 25, wherein the bus bar is formed of a plate-shaped member and formed in an arc along an outer periphery of the stator core.

28. A three-phase motor according to claim 25, wherein a plurality of bus bars are installed along an outer periphery of the stator core.

29. A three-phase motor according to claim 25, wherein a width of the bus bar in the axial direction of the stator is formed smaller than a width of the end of the coil assembly extending in the axial direction from the stator core.

* * * * *

UNITED STATES PATENT AND TRADEMARK OFFICE
CERTIFICATE OF CORRECTION

PATENT NO. : 6,703,749 B2
DATED : March 9, 2004
INVENTOR(S) : Kuroyanagi

It is certified that error appears in the above-identified patent and that said Letters Patent is hereby corrected as shown below:

Column 4,
Line 14, "12(c)" should read -- 13(c) --.

Column 9,
Line 57, "2000-39966" should read -- 2000-399666 --.

Column 11,
Line 3, "conductor" should read -- conductors --.

Signed and Sealed this

First Day of February, 2005

JON W. DUDAS
*Director of the United States Patent and Trademark Office*